(12) United States Patent
Kanamarlapudi et al.

(10) Patent No.: US 11,844,078 B2
(45) Date of Patent: Dec. 12, 2023

(54) DYNAMIC SELECTION OF LCP PARAMETERS

(71) Applicant: QUALCOMM Incorporated, San Diego, CA (US)

(72) Inventors: Sitaramanjaneyulu Kanamarlapudi, San Diego, CA (US); Leena Zacharias, San Jose, CA (US); Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 29 days.

(21) Appl. No.: 17/203,649

(22) Filed: Mar. 16, 2021

(65) Prior Publication Data

US 2021/0329620 A1    Oct. 21, 2021

Related U.S. Application Data

(60) Provisional application No. 63/012,855, filed on Apr. 20, 2020.

(51) Int. Cl.
*H04W 72/21* (2023.01)
*H04W 28/02* (2009.01)
*H04W 76/27* (2018.01)
*H04W 80/08* (2009.01)
*H04W 80/06* (2009.01)

(52) U.S. Cl.
CPC ....... *H04W 72/21* (2023.01); *H04W 28/0278* (2013.01); *H04W 76/27* (2018.02); *H04W 80/06* (2013.01); *H04W 80/08* (2013.01)

(58) Field of Classification Search
CPC ............. H04W 72/0413; H04W 76/27; H04W 28/0278; H04W 72/1284; H04W 80/06; H04W 80/08
See application file for complete search history.

(56) References Cited

U.S. PATENT DOCUMENTS

| 2019/0394785 | A1  | 12/2019 | He  |           |
|---|---|---|---|---|
| 2022/0022219 | A1* | 1/2022 | Liu | H04L 5/0094 |
| 2022/0150748 | A1* | 5/2022 | Jo  | H04W 28/0268 |
| 2022/0174687 | A1* | 6/2022 | Kuo | H04W 72/14 |

OTHER PUBLICATIONS

Jacobson, V. "Congestion avoidance and control" Proceedings of SIGCOMM '88 (Stanford, CA, Aug. 1988), ACM. (Year: 1988).*

(Continued)

*Primary Examiner* — Basil Ma
(74) *Attorney, Agent, or Firm* — Procopio, Cory, Hargreaves & Savitch

(57) ABSTRACT

Aspects of a method, a computer-readable medium, and an apparatus are provided for wireless communication at a base station. The apparatus configures a user equipment (UE) with a first logical channel prioritization (LCP) configuration and a second LCP configuration for a logical channel. The apparatus indicates for the UE to use the first LCP configuration for uplink transmissions on a logical channel based on a first condition. The apparatus indicates for the UE to use the second LCP configuration for the uplink transmissions on the logical channel based on a second condition. The UE transmits uplink transport blocks based on the indicated LCP configuration for the logical channel.

30 Claims, 9 Drawing Sheets

(56) References Cited

OTHER PUBLICATIONS

R2-1912845 Nokia "Regarding Fixed LCP Restrictions" 3Gpp WG2 #107bis Chongqing Oct. 14-18, 2019 (Year: 2019).*
Huawei, et al., "Discussion on LCP in Case of Activation of PDCP CA Duplication", 3GPP Draft, R2-1802258, 3GPP TSG-RAN WG2 Meeting 101, 3rd Generation Partnership Project (3GPP), Mobile Competence Centre, 650, Route Des Lucioles, F-06921 Sophia-An, vol. RAN WG2, no. Athens, Greece, Feb. 26, 2018-Mar. 3, 2018, Feb. 16, 2018 (Feb. 16, 2018), XP051400103, 3 Pages, Retrieved from the Internet: URL: http://www.3gpp.org/ftp/tsg%5Fran/WG2%5FRL2/TSGR2%5101/Docs/ [retrieved on Feb. 16, 2018] Sections 5.4.3.1.1, 5 .4.3.1.2, pp. 2-3.
International Search Report and Written Opinion—PCT/US2021/022807—ISA/EPO—dated Jul. 1, 2021.
Nokia, et al., "LCP Mapping Restrictions", 3GPP Draft, R2-2002740, 3GPP TSG-RAN WG2 Meeting #109bis-e, 3rd Generation Partnership Project (3GPP), Mobile Competence Centre, 650, Route Des Lucioles, F-06921 Sophia-Antipolis Cedex, France, vol. RAN WG2, No. Online Meeting, Apr. 20, 2020-Apr. 30, 2020, Apr. 9, 2020 (Apr. 9, 2020), XP051870142, 2 Pages, Retrieved from the Internet: URL: https://ftp.3gpp.org/tsg_ran/WG2_RL2/TSGR2_109bis-e/Docs/R2-2002740.zip [retrieved on Apr. 9, 2020] the whole document.
Nokia, et al., "Regarding Fixed LCP Restrictions", 3GPP Draft, R2-1912845, 3GPP TSG-RAN WG2 Meeting #107bis, TEI Regarding Fixed LCP Restrictions, 3rd Generation Partnership Project (3GPP), Mobile Competence Centre, 650, Route Des Lucioles, F-06921 Sophia-Antipolis Cedex, France, vol. RAN WG2, no. Chongqing, China, Oct. 14, 2019-Oct. 18, 2019, Oct. 4, 2019 (Oct. 4, 2019), XP051804659, 2 Pages, Retrieved from the Internet: https://ftp.3gpp.org/tsg_ran/WG2_RL2/TSGR2_107bis/Docs/R2-1912845.zip [retrieved on Oct. 4, 2019] the whole Document.

* cited by examiner

DYNAMIC SELECTION OF LCP PARAMETERS

CROSS REFERENCE TO RELATED APPLICATION(S)

This application claims the benefit of U.S. Provisional Application Ser. No. 63/012,855, entitled "Dynamic Selection of LCP Parameters" and filed on Apr. 20, 2020, which is expressly incorporated by reference herein in its entirety.

BACKGROUND

Technical Field

The present disclosure relates generally to communication systems, and more particularly, to wireless communication including logical channel prioritization.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a base station. The apparatus configures a user equipment (UE) with a first logical channel prioritization (LCP) configuration and a second LCP configuration for a logical channel. The apparatus indicates for the UE to use the first LCP configuration for uplink transmissions on a logical channel based on a first condition. The apparatus indicates for the UE to use the second LCP configuration for the uplink transmissions on the logical channel based on a second condition.

In another aspect of the disclosure, a method, a computer-readable medium, and an apparatus are provided for wireless communication at a UE. The apparatus receives a configuration for a first LCP configuration and a second LCP configuration for a logical channel. The apparatus receives a first indication to use the first LCP configuration for uplink transmissions on the logical channel based on a first condition and receives a second indication to use the second LCP configuration for the uplink transmissions on the logical channel based on a second condition. The apparatus transmits an uplink transmission based on the first LCP configuration or the second LCP configuration. For example, the apparatus may transmit uplink transport blocks based on the LCP configuration for the logical channel that meets a particular condition.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
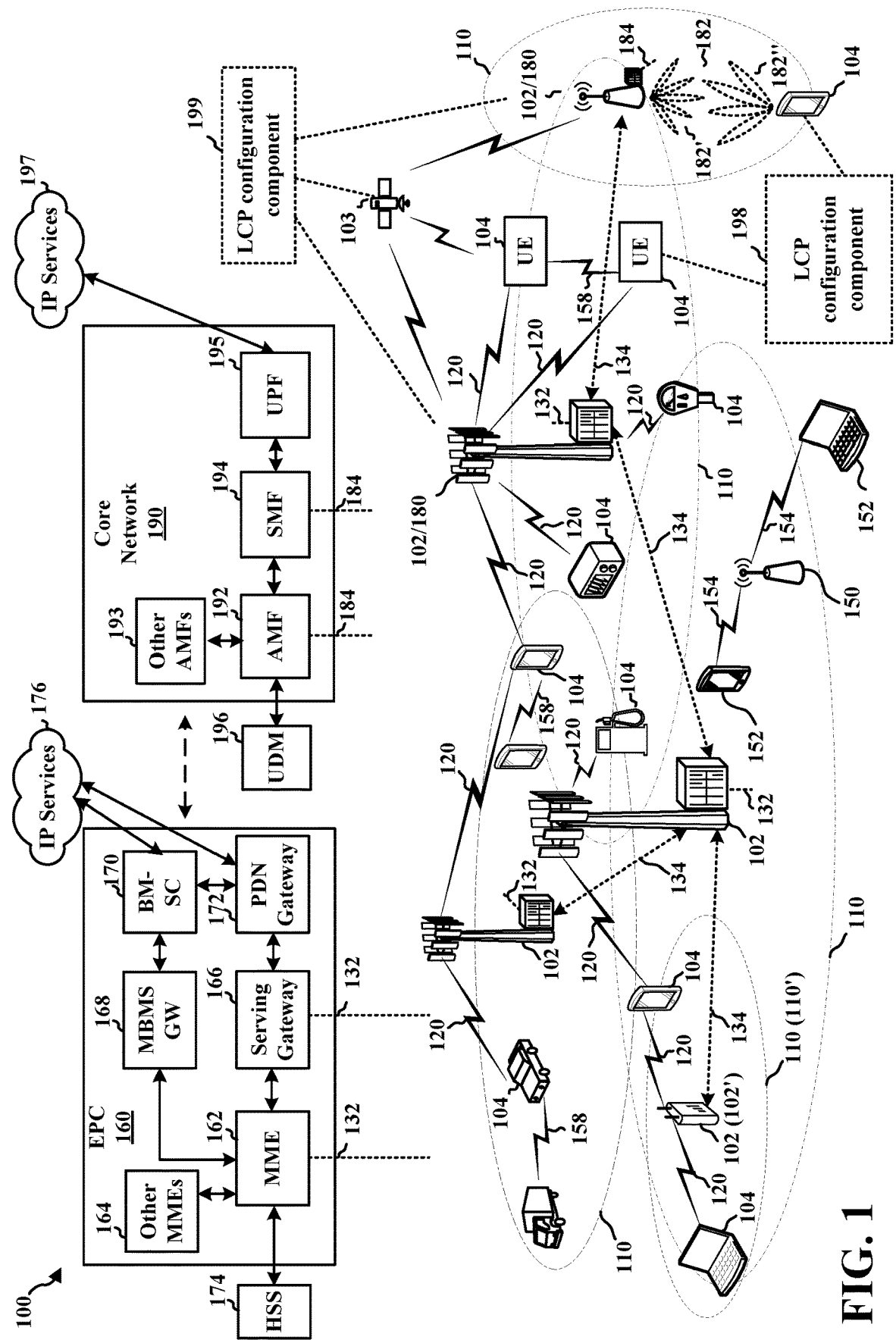
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

During a transmission control protocol (TCP) slow start phase, there may be an increased number of TCP ACKs from a UE for the given number of TCP packets that are transmitted by the base station. A TCP congestion window may start with a small value and may scale quickly with the number of TCP acknowledgments (ACKs) until the TCP flow reaches a steady state. Thus, TCP implementations may have frequent ACKs in an early TCP stage (such as during the slow start phase) following connection. Parameters may be configured to be more optimal for the steady state phase and may lead to transport blocks that include more ACKs than the network can decode. The network may discard at least a portion of the ACKs in the transport block, leading to retransmissions and delayed congestion window scaling. Aspects presented herein enable improved TCP procedure management of uplink traffic through a base station configuring multiple logical channel prioritization (LCP) scheduling configurations for each logical channel. The multiple LCP scheduling configurations enable the dynamic selection between the different configurations based on different TCP phases (e.g., the slow start phase or the steady state phase) and/or network conditions. The aspects presented herein provide for improved efficiency in resource allocation while also providing an improved user experience.

FIG. 1 is a diagram illustrating an example of a wireless communications system and an access network 100 including base stations 102 and 180 and multiple UEs 104. As described herein, the base station 102 or 180 may include an LCP configuration component 199 that configures the UE 104 with a first LCP configuration and a second LCP configuration for a logical channel and (dynamically) indicates for the UE to use the first LCP configuration or the second LCP configuration. The base station 102 or 180 may also be configured to receive uplink transmissions from the UE based on the first LCP configuration or the second LCP configuration. The UE 104 may include an LCP configuration component 198 that is configured to receive a first LCP configuration and a second LCP configuration for a logical channel and (dynamically) receive one or more indications for the UE to use the first LCP configuration or the second LCP configuration. The LCP configuration component 198 may be further configured to transmit an uplink transmission based on the first LCP configuration or the second LCP configuration. For example, the UE 104 may transmit uplink transport blocks based on the LCP configuration for the logical channel that meets a particular condition.

The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. Aspects described herein are not limited to terrestrial networks and may similarly be applicable to a non-terrestrial network (NTN). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to YMHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency (RF) band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies.

Figure 2:
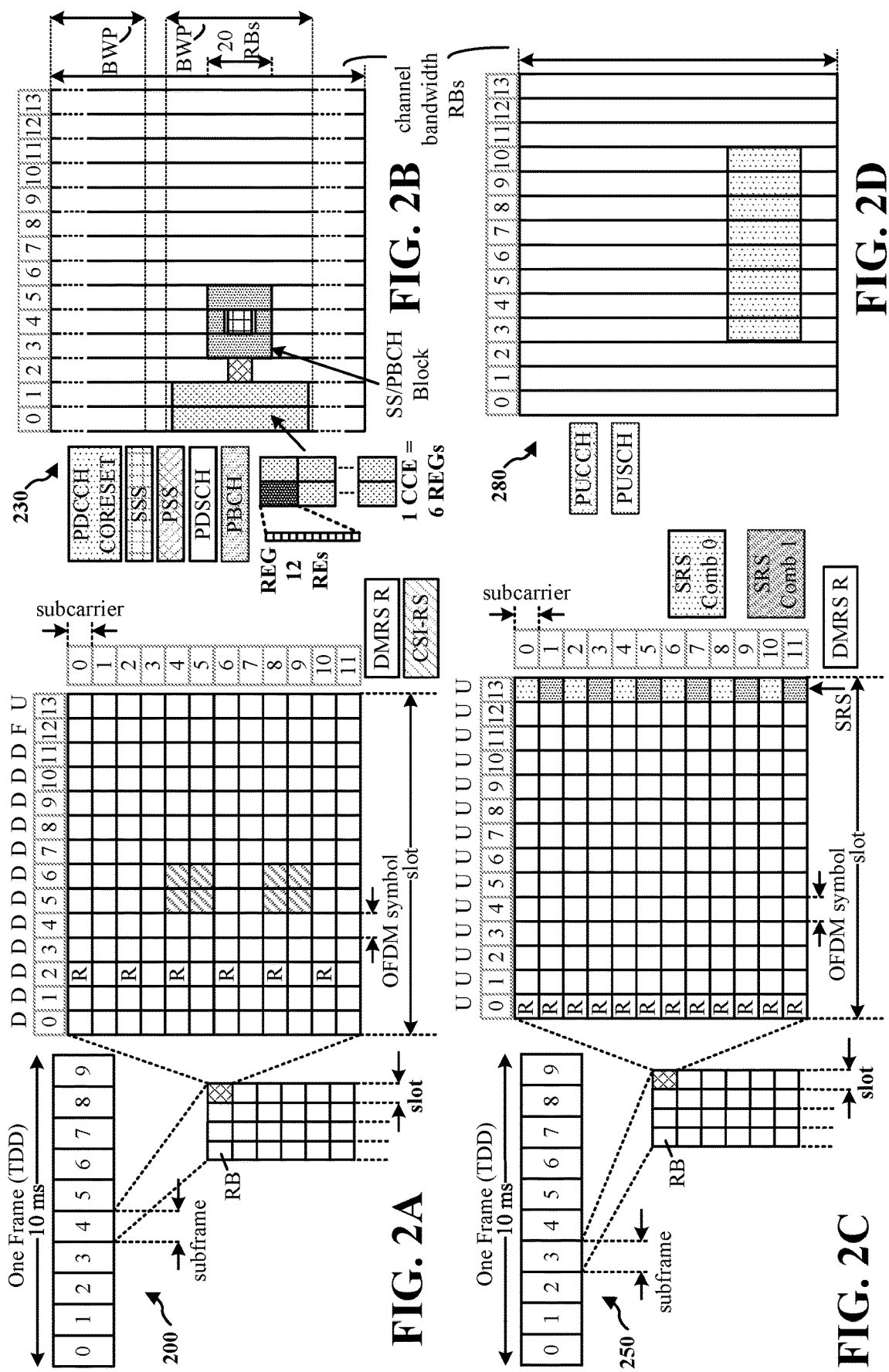
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC- FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu * 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

Figure 3:
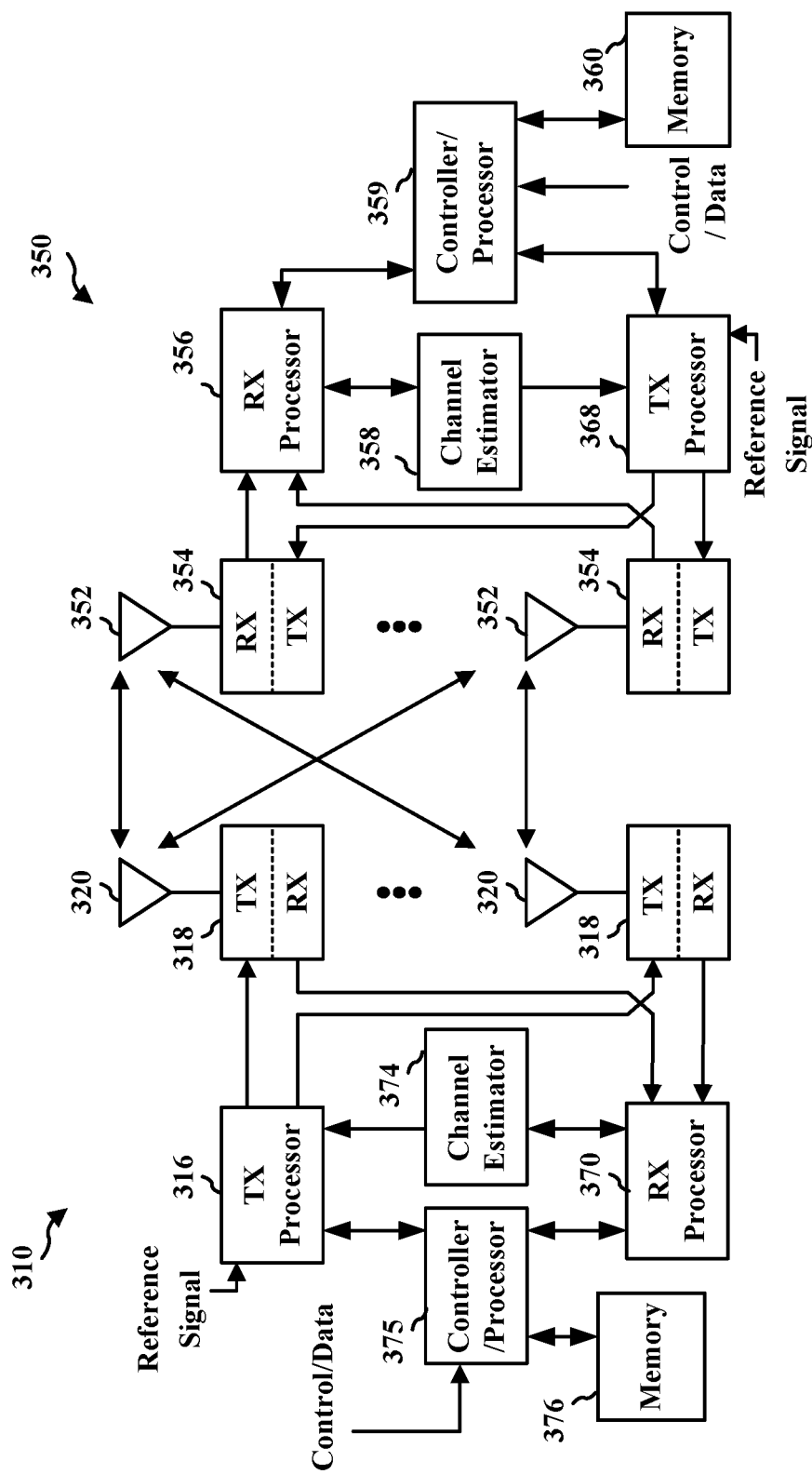
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the LCP configuration component 198 of FIG. 1.

At least one of the TX processor 316, the RX processor 370, and the controller/processor 375 may be configured to perform aspects in connection with the LCP configuration component 199 of FIG. 1.

A logical channel prioritization (LCP) procedure is applied when a new transmission is performed by a wireless device. Uplink data scheduling is controlled through an RRC layer by signaling for each logical channel per MAC entity. The RRC layer additionally controls the LCP procedure by configuring mapping restrictions for each logical channel. The UE may receive the control signaling from a base station and apply the control to uplink transmissions.

When a new transmission is performed, the MAC entity may select the logical channels for each uplink grant that satisfies one or more particular conditions. The particular conditions may be referred to as mapping restrictions for each logical channel. An example condition is a set of one or more subcarrier spacings for transmission, which may be configured as allowed subcarrier spacing index values (e.g., in "allowedSCS-List"). If an allowed SCS list is configured for a logical channel, the MAC entity may select the logical channel to transmit an uplink transmission based on the subcarrier spacing index associated with the uplink grant being in the configured set of allowed SCSs.

Another example condition is a maximum PUSCH duration for the transmission (e.g., which may be referred to as "maxPUSCH-Duration,"). If the maximum PUSCH duration is configured for a logical channel, the MAC entity may select the logical channel for the uplink transmission based on the configured maximum PUSCH duration being larger than or equal to the PUSCH transmission duration associated with the UL grant.

Another example condition is a configuration enabling a particular grant type to be used for transmission on the logical channel. As an example, the configuration may allow for a configured grant type 1 (e.g., which may be referred to as a "configuredGrantType1Allowed") to be used for transmission on the logical channel. As an example, if the logical channel is configured to allow configured grant type 1 (e.g., by "configuredGrantType1Allowed" being set to true), the MAC entity may select the logical channel for the uplink transmission if the uplink grant is a configured grant type 1.

Another example condition is a set of one or more allowed cells that are allowed for transmission on a logical channel (e.g., which may be referred to as "allowedServingCells"). If a set of one or more allowed cells is configured for the logical channel, the MAC entity may select the logical channel for the uplink transmission based on the allowed cells including a cell with cell information associated to the UL grant. The subcarrier spacing index, PUSCH transmission duration and cell information may be included in uplink transmission information received from lower layers for the corresponding scheduled uplink transmission.

When a new transmission is performed, the MAC entity may allocate resources to the logical channels. For example, the logical channels selected for the UL grant, e.g., with Bj>0, the MAC entity may allocate resources in a decreasing priority order. Bj corresponds to an amount of data an indicates a maximum amount of the data to be encoded on a selected logical channel, e.g., for a prioritized bit rate (PBR) and a bucket size duration (BSD). If the PBR of a logical channel is set to a high level, such as infinity, the MAC entity may allocate resources for all the data that is available for transmission on the logical channel before meeting the PBR of the lower priority logical channel(s). The MAC entity may decrement Bj by the total size of MAC SDUs served to logical channel j above. If any resources remain, all the selected logical channels may be served in a decreasing priority order (regardless of the value of Bj) until either the data for that logical channel or the UL grant is exhausted, whichever comes first. Logical channels configured with equal priority may be served equally. The value of Bj can be negative.

If the MAC entity is requested to simultaneously transmit multiple MAC PDUs, or if the MAC entity receives multiple UL grants within one or more coinciding PDCCH occasions (i.e. on different Serving Cells), the UE may determine the order in which the grants are processed.

The UE may also follow rules during the scheduling procedures. For example, a UE may not segment an RLC SDU (or partially transmitted SDU or retransmitted RLC PDU) if the whole SDU (or partially transmitted SDU or retransmitted RLC PDU) fits into the remaining resources of the associated MAC entity. As another example, if the UE segments an RLC SDU from the logical channel, the UE may maximize the size of the segment to fill the grant of the associated MAC entity as much as possible. As another example, the UE may maximize the transmission of data. As another example, if the MAC entity is given an uplink grant size that is equal to or larger than 8 bytes while having data available and allowed for transmission, the MAC entity may not transmit only padding BSR and/or padding.

In some aspects, the MAC entity may not generate a MAC PDU for the HARQ entity if one or more conditions are satisfied. The conditions may include the MAC entity being configured with an indication to skip an uplink transmission, such as "skipUplinkTxDynamic" being configured with a true value, the grant indicated to the HARQ entity being addressed to a cell radio network temporary identifier (C-RNTI), or the grant indicated to the HARQ entity being a configured uplink grant; there being no aperiodic CSI requested for this PUSCH transmission; the MAC PDU including zero MAC SDUs; and the MAC PDU including only the periodic buffer status report (BSR) and there is no data available for any logical channel group (LCG), or the MAC PDU includes only the padding BSR.

Logical channels may be prioritized in accordance with a priority order, e.g., in order from a highest priority including C-RNTI MAC-CE or data from uplink common control channel (UL-CCCH); configured grant confirmation MAC-CE; MAC-CE for BSR, with exception of BSR included for padding; single entry power headroom report (PHR) MAC-CE or multiple entry PHR MAC-CE; data from any logical channel, except data from an UL-CCCH; MAC-CE for a recommended bit rate query; and MAC-CE for BSR included for padding.

Transmission control protocol (TCP) uses network congestion avoidance aspects including a slow start phase and a congestion window to help prevent congestion. For example, TCP may enable control so that the transmitter does not send a number of packets beyond the receiver's ability to receive the packets. Acknowledgments for transmitted data, or the lack of such acknowledgments, may be used by the transmitter to infer network conditions between the TCP sender and receiver and to alter the behavior of the flow of data. Based on network congestion, traffic load balancing, or unpredictable network behavior, packets may be lost, duplicated, or delivered out of order at the lower levels of a protocol stack. TCP may help to detect these problems, request re-transmission of lost data, and rearrange out-of-order data. TCP may help to reduce network congestion to reduce the occurrence of the other problems.

A congestion window may be maintained by the transmitter for each connection. The transmitter may use the congestion window to avoid transmitting too much traffic to a receiver by limiting the total number of unacknowledged packets that may be in transit. A slow start is also used to avoid transmitting more data that is capable of being handled. The congestion window starts with a smaller value, e.g., a small multiple of the maximum segment size (MSS) in size, upon connection establishment between the transmitter and receiver. During the slow start phase, the congestion window scales quickly from the small beginning value in response to a number of TCP ACKs. Although the initial transmission rate may be low due to the small size of the congestion window, the rate of increase may be rapid. For every acknowledged packet, the congestion window increases by 1 MSS so that the congestion window effectively doubles with each received TCP acknowledgement. The congestion window may be continually scaled in this manner until the TCP flow reaches a steady state, e.g., until a threshold is reached, packet loss occurs, etc. The increased size of the congestion window increases the transmission rate to the receiver. In the steady state, the congestion window may be adjusted differently, e.g., without the same level of scaling that is applied during the slow start phase. As an example, the congestion window may scale linearly with each TCP acknowledgment that is received during the steady state phase.

TCP may be optimized for accurate delivery rather than timely delivery and can incur relatively long delays while waiting for out-of-order messages or re-transmissions of lost messages. If latency is reduced, the receiver may acknowledge packets more quickly, which then enables an increase in the congestion window size in a faster manner. Thus, a reduction in uplink latency can impact TCP downlink performance. As the initial window size for a TCP connection is small, the increase in the window size increases with each size increment. The effect of latency reduction may be more considerable during the slow start phase. The impact during the slow start phase may be larger for small file sizes, where the slow start phase may last for the duration of the file. If the TCP rates can be accelerated, the user experience be improved by the throughput increases, and the capacity of the system may be used more efficiently through the delivery of more packets. Shorter latency techniques may increase overhead, which may be less effective during the steady state phase. For example, a larger overhead may reduce throughput in the steady state phase.

Latency may be reduced through configured grant (CG) resources and/or larger numerologies. An allocation of CG resources provides periodic resources that may be used for transmission. The mapping of logical channels on CG resources and/or numerologies may be controlled by the network. LCP Mapping Restrictions, may be dynamically reconfigured so that TCP traffic can benefit from CG resources and large numerologies in different phases without over dimensioning the system.

A base station may configure multiple sets of LCP mapping restrictions for a UE, e.g., in RRC signaling. Then, the base station may dynamically activate/deactivate different sets of LCP mapping restrictions. For example, the base station may send an indication to activate a set of LCP mapping restrictions in a MAC-CE. The MAC-CE may indicate the logical channel and one or more bits indicating to activate/deactivate the RRC configured set of LCP mapping restrictions.

During the TCP slow start phase, there may be an increased number of TCP ACKs from the receiver for the given number of TCP packets that are transmitted by the transmitter. As noted above, the TCP transmitter side congestion window starts with a smaller value and scales up with the number of TCP ACKs, until TCP flow reaches a steady state. Thus, many TCP implementations may have frequent ACKs in the early stage following connection, e.g., as part of the TCP slow start operation. Aspects presented herein enable improved TCP slow start management of uplink traffic, e.g., ACKs from the receiving UE.

With the TCP packet collapsing features in downlink, such as TCP generic receive offload (GRO)/large receive offload (LRO) or Receive Side Coalescing (RSC), 1 TCP ACK may be sent by the UE in uplink for 2 downlink TCP Data packets. With GRO/LRO/RSC, the UE may consume roughly 15K worth bytes in each TCP packet. This may lead to 60B uplink TCP ACK traffic for 30K downlink TCP Data traffic.

As servers may count the number of ACKs in the ramp up phase (e.g., the slow start phase) to adjust the TCP congestion window size, the UE may send one TCP ACK per 1.5 KB or 3 KB TCP downlink traffic for the first few seconds of a new transmission, e.g., until the TCP downlink transmission reaches a stable state (e.g., the steady state phase).

Network infrastructure may have difficulty processing more than 200 RLC PDUs in one MAC TB. With a CG of 27K or more, each MAC TB may carry close to 400 to 500 RLC PDUs (TCP ACKs). The network may not be able to decode/process more than 200 RLC PDUs. The remaining 300 RLC PDUs in the MAC TB may be discarded by the network. As an example, if the UE encodes and transmits 500 packets, the base station may decode the first 200 packets and may simply discard the remaining 300 packets. Discarding a portion of the packets of the MAC TB from a UE may result in continuous holes at the RLC acknowledge mode (AM) level for the base station. The packets for the holes may be recovered through RLC automatic repeat request (ARQ). The RLC ARQ process may be a slow recovery process, as Treassembly may be more than a HARQ level recovery or CG opportunity. In some aspects, Treassembly may involve an RLC level reassembly timer to detect missing holes at a PHY HARQ level. RLC ARQ also increases the outstanding TCP ACKs in uplink (e.g., due to the transmission of new packets and dropped packets). Thus, discarding the portion of the packets of the MAC TB may cause the network difficultly in quickly obtaining the TCP ACKs in-sequence and may lead to holes at PDCP reordering window and Treordering expiry. In some aspects, Treordering may involve a timer to detect missing holes at a PDCP level. Treordering may refer to the process after expiration of the timer, e.g., that the PDCP stops waiting for PDU recovery and allows PDUs in a reordering window to be processed.

Aspects presented herein improve the TCP process in different ways than adjusting a CG configuration (e.g., a grant value or periodicity) and/or periodic grant configuration, which may be tuned for the steady state phase. Changes to the CG configuration or periodic grant configuration may be based on an RRC level reconfiguration for the UE, which may involve an amount of time that does not benefit the slow start phase of the TCP process.

In medium access control (MAC), each logical channel may be configured with mapping restrictions. The RRC may additionally control the LCP procedure by configuring mapping restrictions for each logical channel. The LCP mapping restrictions may include, e.g., a list of allowed subcarrier spacing(s) for transmission (e.g., which may be referred by a parameter name such as "allowedSCS-List"), a maximum PUSCH duration allowed for the transmission (e.g., which may be referred to by a parameter name such as "maxPUSCH-Duration"), whether a configured grant Type 1 can be used for the transmission (e.g., which may be referred to by a parameter name such as "configuredGrantType1Allowed"), and the allowed cell(s) for transmission (e.g., which may be referred to by a parameter name such as "allowedServingCells").

The network may configure the CG opportunity and the grant size based on steady state traffic, which may not accommodate the temporarily increased uplink traffic that occurs during the slow start phase. A radio network entity, e.g., a base station 102 or 180, may not have the flow level state information, which may be a Core Network functionality (e.g., of core network 190 or EPC 160).

For example, a network may have a configuration with a smaller CG value (e.g., uplink grant size or longer duration). During the slow start phase, the UE may have a larger number of packets waiting to be transmitted to the base station even after a CG occasion. The TCP window scale up may be slow during the slow start phase, e.g., due to the small starting size of the window. In a steady state phase, the CG with the smaller CG value may be sufficient for the uplink traffic.

The network may have a larger CG (e.g., larger uplink grant size or smaller duration). During the slow start phase, the UE might packet a large number of packets into one MAC TB, which may lead to the network discarding a portion of the packets, as discussed above. In the steady state phase, the larger CG may lead to waste of granted resources (e.g., MAC padding), as the UE may have fewer TCP ACKs to send during this steady state phase.

Similarly, other restrictions such as the CG periodicity, the allowed SCS, and the allowed serving cells may be configured based on the steady state traffic model, which may not work well during the slow start phase. Thus, the base station may configure multiple LCP restriction sets and may dynamically activate them to provide better resource allocations for the different TCP phases (e.g., the slow start phase and the steady state phase). The network may select different restrictions at the RAN level, e.g., based on the uplink traffic pattern (a large number of ACKs or RLC PDUs in one MAC TB) and/or a downlink traffic pattern (TCP scaling up or steady state information from a core network). The different amounts of uplink traffic during different phases of the TCP process may become more of an issue when the uplink is on a thinner pipe (e.g., a smaller bandwidth, such as using LTE or NR with a smaller bandwidth) while the downlink has a fatter pipe (e.g., a larger bandwidth, such as using NR with higher bandwidth).

The LCP mapping restrictions may focus on the PHY parameters to be chosen for the given logical channel traffic. As presented herein, different LCP scheduling configurations may be configured for the UE (e.g., MAC level parameters) that can be dynamically activated/deactivated. The RRC layer may control the scheduling of uplink data through control signalling for each logical channel per MAC entity. The scheduling of the uplink data for each logical channel per MAC entity may be controlled based on priority, e.g., where an increasing priority value indicates a lower priority level. The scheduling of the uplink data for each logical channel per MAC entity may be controlled based on a PBR (e.g., "priornisedBitRate"). The scheduling of the uplink data for each logical channel per MAC entity may be controlled based on a bucket size duration (e.g., "bucketSizeDuration"). In some examples, the scheduling of the uplink data for each logical channel per MAC entity may be controlled based on any combination of priority, prioritized bit rate, or bucket size duration.

The base station may configure multiple LCP scheduling configurations (including one or more of a priority value, a prioritized bit rate, or a bucket size duration) for a logical channel per MAC entity. The different LCP scheduling configurations may enable the base station to dynamically select MAC parameters for the logical channel that contribute to which logical channel (e.g., based on priority) is included in the uplink MAC TB and how much data (e.g., Bj) from the logical channel is included in the uplink MAC TB. The parameter Bj indicates how many packets (e.g., a maximum) can be encoded from the chosen logical channel based on the prioritized bit rate and bucket size duration configured for the LCP scheduling configuration. The different LCP scheduling configurations (e.g., with MAC level parameters) may be used in combination with multiple configured LCP restrictions (e.g., with PHY level parameters). For example, the base station may activate one or multiple configured LCP scheduling configurations and may activate one or multiple configured LCP mapping restrictions. In some examples, the base station may activate different LCP scheduling configurations for the slow start phase and the steady state phase of the TCP procedure.

Figure 4:
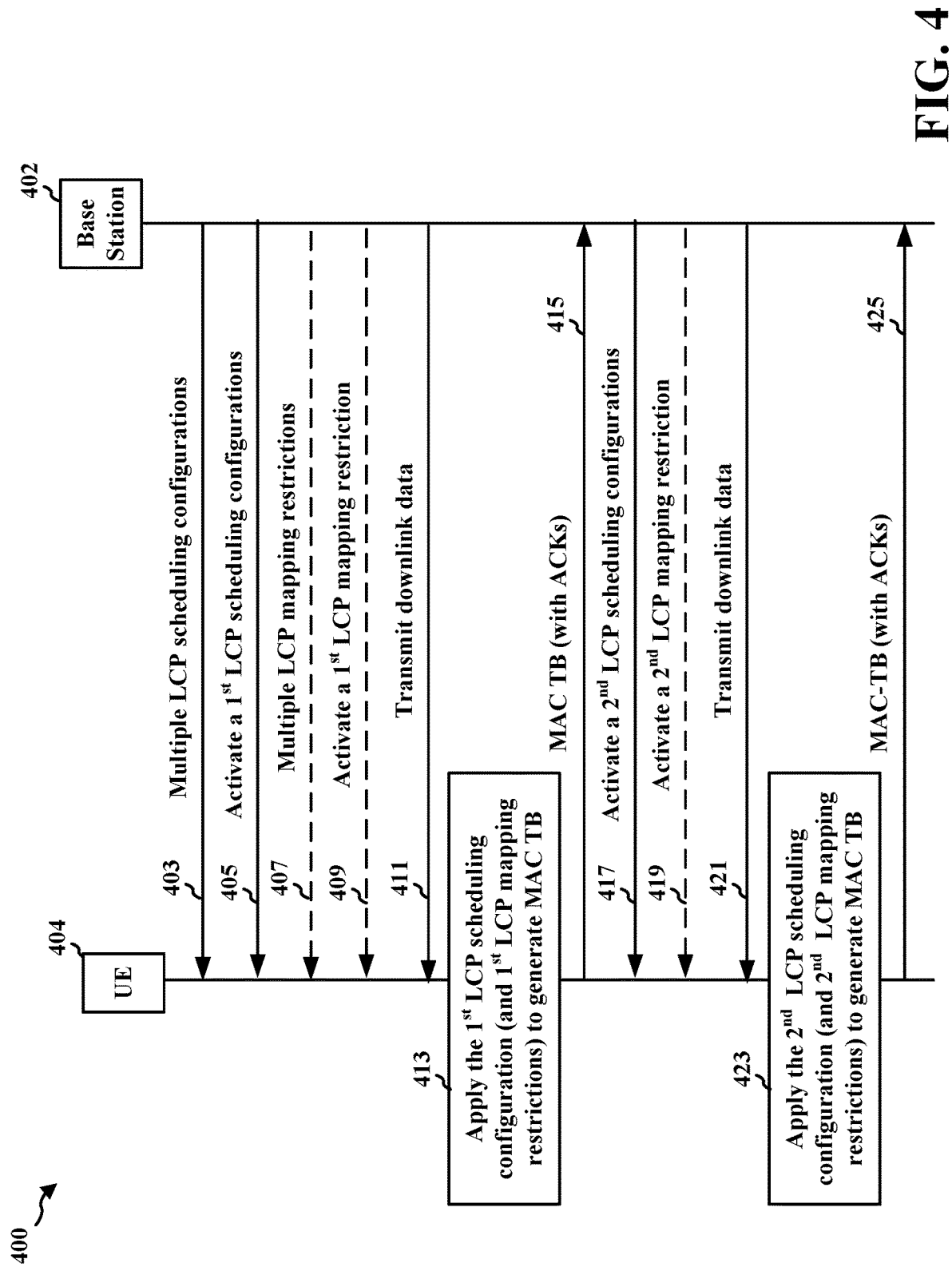
FIG. 4 is an example communication flow between a UE and a base station that includes the configuration of the UE with multiple LCP scheduling configurations including aspects presented herein.

FIG. 4 illustrates an example communication flow 400 between a UE 404 and a base station 402 that includes the configuration of multiple LCP scheduling configurations. Aspects described in connection with FIG. 4 are not limited to a base station of a terrestrial network and may similarly be applicable to an NTN. As illustrated at 403, the base station 402 configures multiple sets of LCP scheduling configurations for a logical channel. The LCP scheduling configurations 403 may be configured for the UE in RRC signaling. As an example, the multiple sets may include a first set of [Priority, PBR, BSD]$_1$ and a second set of [Priority, PBR, BSD]$_2$ for the logical channel.

The base station 402 may dynamically choose a first configured set of LCP scheduling configurations, e.g., [Priority, PBR, BSD]$_i$ for a given logical channel. As an example, the base station may select the first set of LCP scheduling configurations for slow start phase or a steady state, e.g., based on a dynamic state of the traffic between the UE and the base station. The base station 402 indicates the selection of the first LCP scheduling configuration to the UE, at 405. For example, the base station may activate the 1$^{st}$ LCP scheduling configuration in a MAC-CE. The dynamic indication, at 405, is illustrated as a dashed line. In some examples, one of the LCP scheduling configurations may be a default LCP scheduling configuration that is applied until the default LCP scheduling configuration is deactivate and/or until a different LCP scheduling configuration is activated. The base station 402 may activate/deactivate the LCP scheduling configurations that are configured at 403 in a MAC-CE that identifies the logical channel (e.g., includes an LCID) and that includes a bit indicating that the LCP scheduling configuration is activated/deactivated. The base station may activate/deactivate the LCP configurations (e.g., switch between LCP configurations) based on an upper layer protocol state, such as a different states of TCP. For example, the base station may activate one LCP configuration during the slow start phase and may switch to the second LCP configuration during the steady state phase. In another example, the base station may activate/deactivate the LCP configurations based on a QUIC condition, an Ethernet condition, etc. In another example, the activation/deactivation may be based on MAC level conditions, such as queue size, etc.

The base station 402 transmits downlink data 411 to the UE 404 based on the logical channel. At 413, the UE applies the first LCP scheduling configuration, whether as a default LCP scheduling configuration or based on the activation at 405, to generate a MAC-TB with one or more ACKs for the downlink data 411. The UE 404 transmits the MAC TB to the base station 402 at 415.

A UE variable (e.g., Bj which is maintained for each logical channel j) may be used for the Logical channel prioritization procedure. The MAC entity may initialize Bj of the logical channel to zero when the logical channel is established.

For each logical channel j, the MAC entity may increment Bj by the product PBR×T before every instance of the LCP procedure, where T is the time elapsed since Bj was last incremented. If the value of Bj is greater than the bucket size (i.e. PBR×BSD), the MAC entity may set Bj to the bucket size. The time at which the UE updates Bj between LCP procedures may be determined by the UE, e.g., as long as Bj is up to date at the time when a grant is processed by LCP.

As conditions change and/or when the TCP procedure reaches a steady state, the base station may dynamically select a different LCP scheduling configuration. The base station 402 indicates the activation of the second LCP scheduling configuration, at 417. The indication may be transmitted in a MAC-CE, similar to the indication at 405.

As illustrated at 423, the UE applies the second LCP scheduling configuration for transmitting ACKs (e.g., in MAC TB 425) for the downlink data 421.

The base station may also configure the UE with multiple LCP mapping restrictions, at 407, and may dynamically select between the different LCP mapping restrictions, at 409 and 419. The configuration at 407 may be in RRC signaling to the UE 404. The dynamic indication, at 409, may be indicated in a MAC-CE to the UE 404. Although illustrated with separate lines, the configurations at 403 and 407 may be transmitted together or in a different order than the illustrated order. For example, the RRC may additionally control the LCP procedure by configuring mapping restrictions for each logical channel. The mapping restrictions for each logical channel may be based on the allowed subcarrier spacings for the transmission, which may be indicated in a list (e.g., "allowedSCS-List"). The mapping restrictions for each logical channel may be based on a maximum PUSCH duration allowed for the transmission (e.g., "maxPUSCH-Duration"). The mapping restrictions for each logical channel may be based on a configured grant type (e.g., "configuredGrantType1Allowed"), such as whether a configured grant Type 1 can be used for the transmission. The mapping restrictions for each logical channel may be based on the allowed cell(s) for the transmission (e.g., "allowed-ServingCells which sets the allowed cell(s) for transmission"). In some examples, the mapping restrictions for each logical channel may be based on any combination of the allowed subcarrier spacings, the maximum PUSCH duration, the configured grant type, or the allowed cells for transmission.

In an example to illustrate the concept, each bearer have 100K of Data to be sent. The base station 402 may configure radio bearer 1 with a first LCP scheduling configuration (e.g., a default configuration) as [Priority 1, PBR=10K, BSD=30K] and a second LCP scheduling configuration (e.g., a boosted configuration) as [Priority 1, PBR=20K, BSD=80k]. For radio bearer 2, the base station 402 may configure a first configuration as [Priority 2, PBR=5K, BSD=50K] and a second configuration as [Priority 1, PBR=10K, BSD=100k]. For radio bearer 3, the base station 402 may configure a first configuration as [Priority 3, PBR=2K, BSD=80K] and a second configuration as [Priority 2, PBR=5K, BSD=150k].

The base station may dynamically select a priority change. For example, during slow start traffic on radio bearer 2, the base station may choose the boosted configuration (e.g., the second LCP scheduling configuration) in order for the uplink traffic from the UE to have Priority 1 rather than the default Priority 2. The base station 402 may indicate an activation of the boosted LCP scheduling configuration at 405 in FIG. 4.

The base station may dynamically select a BSD Change. For example, during slow start traffic on radio bearer 1, the base station may choose the boosted configuration (e.g., the second LCP scheduling configuration) in order for the uplink traffic from the UE to have a larger BSD configuration. In this example, even if the transmission opportunity is spaced with a large gap, instead of capping at 30K, the radio bearer 1 can send up to 80K.

The base station may dynamically select a PBR Change. For example, during slow start traffic on radio bearer 1, the base station may choose the boosted configuration (e.g., the second LCP scheduling configuration) in order for the uplink traffic from the UE to have a larger PBR that is increased from 10K to 20K. During Boosting with a PBR Change, even if the transmission opportunity is spaced with a large gap, the rate at which outstanding allowed data increases for the given time as PBR is changed from 10K to 20K (based on Bj=PBR*T).

PHY level LCP restrictions provide a boost to all of the bearers, whereas only a subset of bearers may be in a slow start phase that would benefit from the change in LCP mapping restrictions. The MAC level LCP scheduling configurations enable the base station to boost a specific bearer, in order to address the particular bearer that has Slow Start phase traffic. The MAC level LCP scheduling configuration provide a finer granularity that enables the base station to address the different phases and traffic for particular bearers. The MAC level LCP scheduling configurations may better address multi-bearer, multi-packet data network (PDN) communication and to select between configurations in a way that is localized to the UE rather than impacting the overall system with PHY parameter changes.

The network's ability to dynamically choose between different configured LCP restrictions at the PHY level and/or between different LCP scheduling configurations at the MAC level (e.g., a using MAC CE, RRC, RLC, PHY) from the network provides flexibility, in dynamically configuring the UE based on the traffic type/state, network radio conditions (such as loading, subcarrier spacing, bandwidth, (ROT)), etc.

Figure 5:
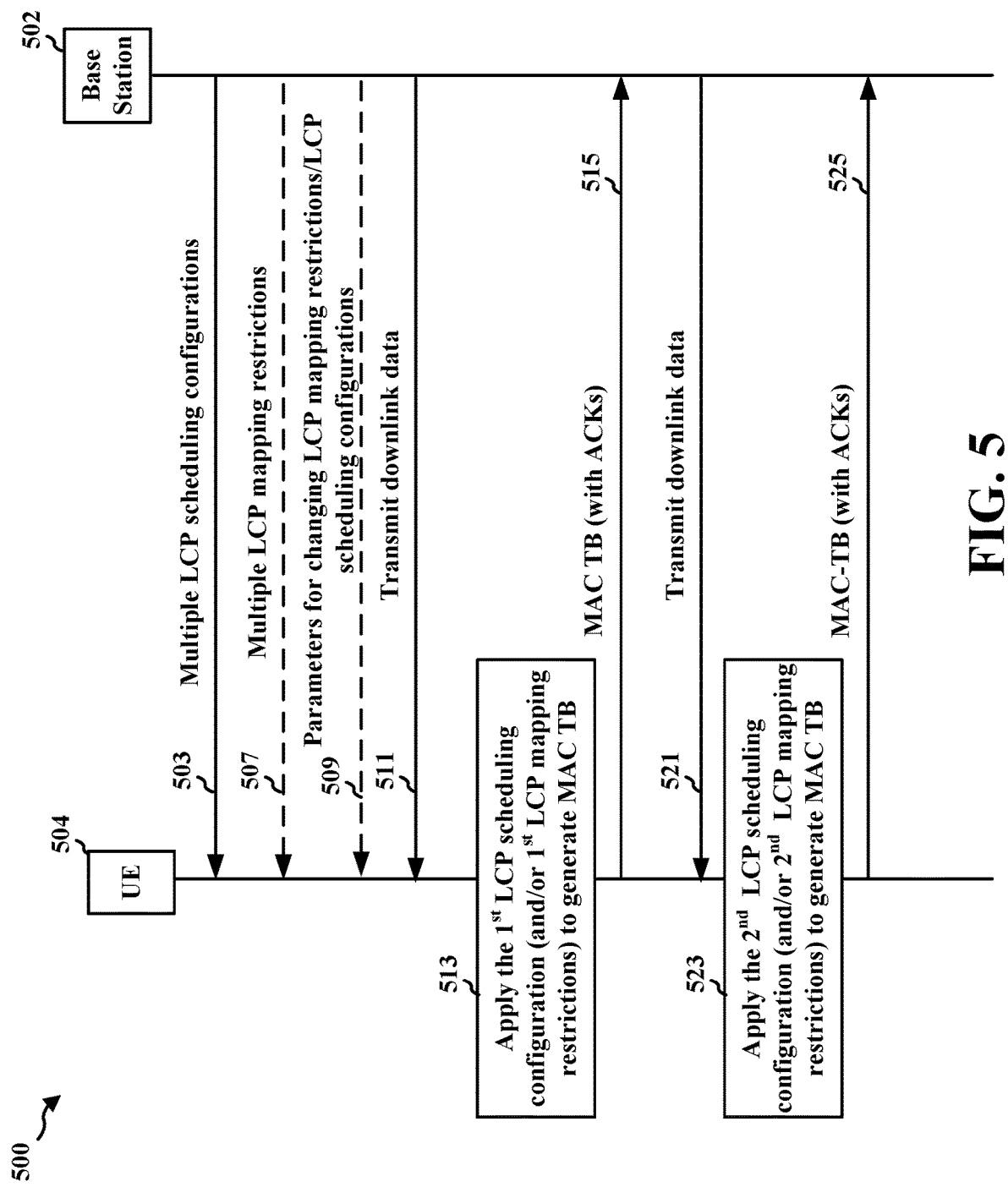
FIG. 5 is an example communication flow between a UE and a base station that includes the configuration of the UE with multiple LCP scheduling configurations including aspects presented herein.

In some examples, the UE may autonomously choose between different configured sets of LCP restrictions and/or LCP scheduling configurations. For example, the UE may autonomously select a set of LCP restrictions/LCP scheduling configuration based on any of UE only intelligence (e.g., information) or based on the conditions the network configured for UE (similar to a Conditional Handover). FIG. 5 illustrates an example communication flow 500 in which the UE 504 may autonomously select between multiple configured LCP restrictions and/or LCP scheduling configurations.

In FIG. 5, the base station 502 configures the UE with multiple LCP scheduling configurations, at 503, and multiple LCP mapping restrictions, at 507, similar to the description in FIG. 4. Similar to FIG. 5, the aspects described in connection with FIG. 5 are not limited to a base station of a terrestrial network and may similarly be applicable to an NTN. However, in FIG. 5, the base station 402 does not activate/deactivate the different configurations. Instead, in FIG. 5, the UE applies a first LCP scheduling configuration and/or a first LCP mapping restriction, at 513. The UE 504 transmits a MAC TB at 515 with ACKs for the downlink data received at 511 based on the first LCP scheduling configuration and/or the first LCP mapping restriction. At 523, the UE 504 determines to switch to using a different LCP scheduling configuration and/or LCP mapping restriction. The UE 504 transmits a MAC TB at 525 with ACKs for the downlink data received at 521 based on the second LCP scheduling configuration and/or the second LCP mapping restriction. In some examples, the UE may determine parameters that may trigger the UE to change to a different configuration. In other examples, the UE may base the determination on parameters that the base station configures for the UE, at 509. In some examples, the UE may apply the first LCP scheduling configuration and/or first LCP mapping restrictions during a slow start phase and may apply the second LCP scheduling configuration and/or second LCP mapping restrictions during a steady state phase.

The dynamic selection between different LCP restrictions and configurations by the network (as in FIG. 4) or the UE (as in FIG. 5) to accommodate TCP Slow Start phase in comparison to the TCP Steady State phase improves the efficient use of radio resources while balancing an improved user experience through quick TCP Scaling. The switch between the LCP configurations (e.g., switch between LCP configurations) based on an upper layer protocol state, such as a different states of TCP. In another example, the switch between the LCP configurations may be based on a QUIC condition, an Ethernet condition, etc. In another example, the switch between the LCP configurations may be based on MAC level conditions, such as queue size, etc.

Figure 6:
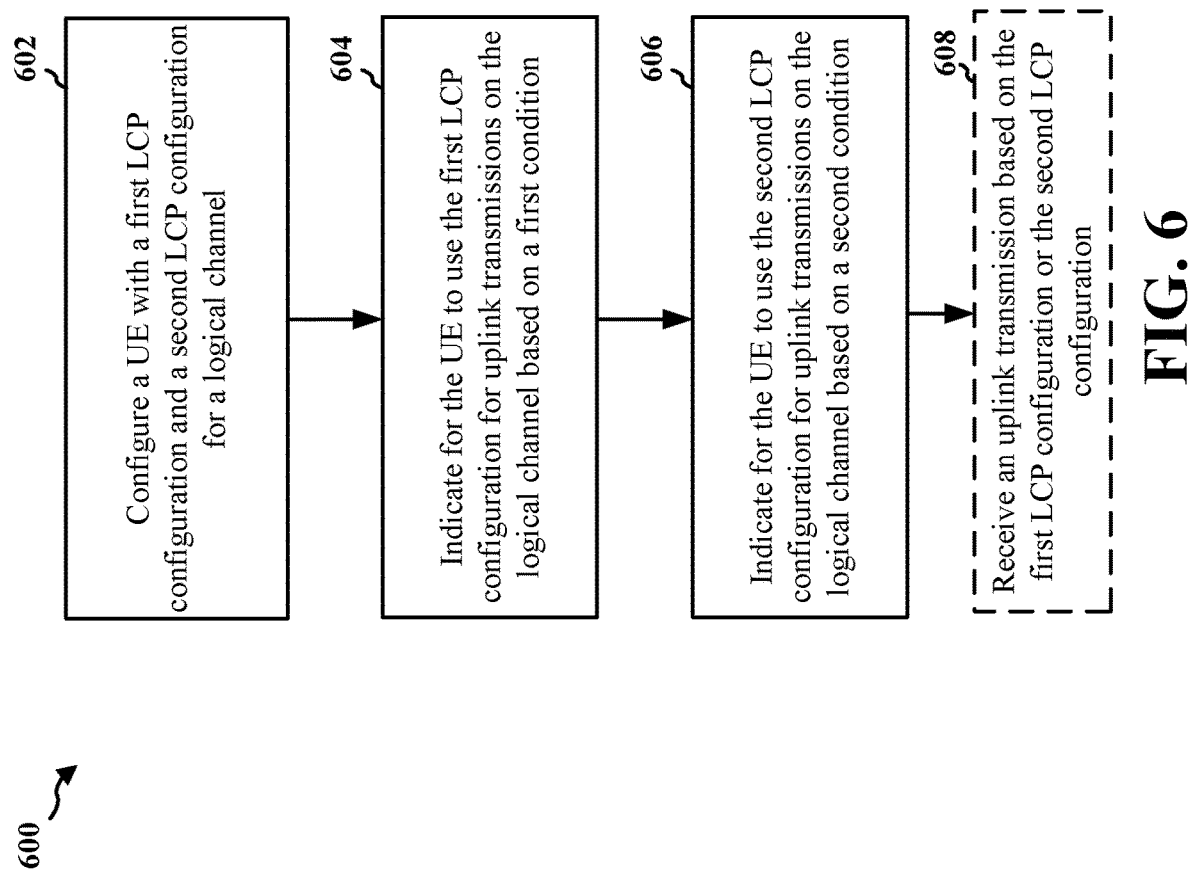
FIG. 6 is a flowchart of a method of wireless communication that includes the application of multiple LCP scheduling configurations.

FIG. 6 is a flowchart 600 of a method of wireless communication. The method may be performed by a base station or a component of a base station (e.g., the base station 102, 180, 310, 402, 502; the apparatus 902 in FIG. 9; a processing system, which may include the memory 376 and which may be the entire base station 310 or a component of the base station 310, such as the TX processor 316, the RX processor 370, and/or the controller/processor 375). Optional aspects are illustrated with a dashed line. The method enables a base station to more efficiently allocate resources and more effectively configure a UE based on different conditions, such as upper layer protocol states or MAC level conditions, for different phases of TCP and/or based on different network conditions.

At 602, the base station configures a UE with a first LCP configuration and a second LCP configuration for a logical channel. The first LCP configuration and the second LCP configuration comprise MAC level LCP configurations. The base station may configure a first LCP configuration and a second LCP configuration for each logical channel. The first LCP configuration and the second LCP configuration each comprise one or more of a priority value for the logical channel, a prioritized bit rate for the logical channel, or a bucket size duration for the logical channel. The priority value for the logical channel may be a lower value indicating a higher priority level in the first LCP configuration than in the second LCP configuration. The prioritized bit rate for the logical channel may be higher in the first LCP configuration than in the second LCP configuration. The bucket size duration for the logical channel may be higher in the first LCP configuration than in the second LCP configuration. The configuration may include aspects described in connection with any of 403, 407, 503, 507 in FIGS. 4 and/or 5. The configuration may be performed, e.g., by the LCP configuration component 940 of the apparatus 902 in FIG. 9 and may be transmitted to a UE by the transmission component 934 via the cellular RF transceiver of the apparatus 902.

At 604, the base station indicates for the UE to use the first LCP configuration for uplink transmissions on a logical channel based on a first condition. The first condition may be based on an upper layer protocol state, a MAC level condition, etc. The indication may be performed, e.g., by the first condition component 944 of the apparatus 902 in FIG. 9 and may be transmitted to a UE by the transmission component 934 via the cellular RF transceiver of the apparatus 902.

For example, as illustrated at 405, the base station may dynamically indicate (e.g., in a MAC-CE) the LCP configuration for the UE to apply. The indication may include an LCID and one or more bits indicating to activate the first LCP configuration (or to deactivate a default LCP configuration), e.g., in response to the base station detecting the second condition. In another example, the base station may indicate for the UE to use the second LCP condition in response to the UE detecting the second condition. For example, the base station may indicate the parameter(s) of the second condition to the UE, and the UE may determine whether to apply the second LCP configuration. In some examples, as illustrated in FIG. 5, the base station may provide parameters to the UE that the UE uses to autonomously select between the first and second LCP configurations.

At 606, the base station indicates, e.g., during a second TCP phase, for the UE to use the second LCP configuration for the uplink transmissions on the logical channel. The indication may be performed, e.g., by the second condition component 948 of the apparatus 902 in FIG. 9 and may be transmitted to a UE by the transmission component 934 via the cellular RF transceiver of the apparatus 902. For example, as illustrated at 417, the base station may dynamically indicate (e.g., in a MAC-CE) the LCP configuration for the UE to apply. The indication may include an LCID and one or more bits indicating to activate the second LCP configuration (or to deactivate a boosted LCP configuration).

The second TCP phase may comprise a steady state phase. The first LCP configuration and the second LCP configuration may be configured in RRC signaling, and the base station may indicate for the UE to use the first LCP configuration or the second LCP configuration in a MAC-CE, e.g., in response to the base station detecting the second condition. In another example, the base station may indicate for the UE to use the second LCP condition in response to the UE detecting the second condition. For example, the base station may indicate the parameter(s) of the second condition to the UE, and the UE may determine whether to apply the second LCP configuration.

The first condition and the second condition may be based on upper layer protocol states. For example, the first condition may comprise a slow start phase of a TCP and the second TCP phase comprises a steady state phase of the TCP. In another example, at least one of the first condition or the second condition may be based on a QUIC condition or an Ethernet condition. In another example, the first condition and the second condition may be based on MAC level conditions.

As illustrated at 608, the base station may receive uplink transmission(s) from the UE based on the first LCP configuration or the second LCP configuration. The reception may be performed, e.g., by the reception component 930 of the apparatus 902 in FIG. 9, e.g., via the cellular RF transceiver 922. For example, the base station may receive one or more TBs with the first LCP configuration, as illustrated at 415 or 515 in FIG. 4 or 5. The base station may receive one or more TBs with the second LCP configuration, as illustrated at 425 or 525 in FIG. 4 or FIG. 5.

Each block in the flowchart of FIG. 6 and/or the aspects that are performed by the base station in FIG. 4 or 5 may be performed by a component of a base station apparatus that may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the base station includes means for performing the method described in connection with FIG. 6 and/or the aspects performed by the base station in FIG. 4 or 5. The means for performing the described aspects of the method(s) may be one or more of the components of an apparatus and/or a processing system of such an apparatus configured to perform the functions recited by the means. The processing system may include a transmission processor, a reception processor, and a controller/processor. As such, in one configuration, the means may be memory 376, the TX processor 316, the RX processor 370, and/or the controller/processor 375 configured to perform the functions recited by the means.

Figure 7:
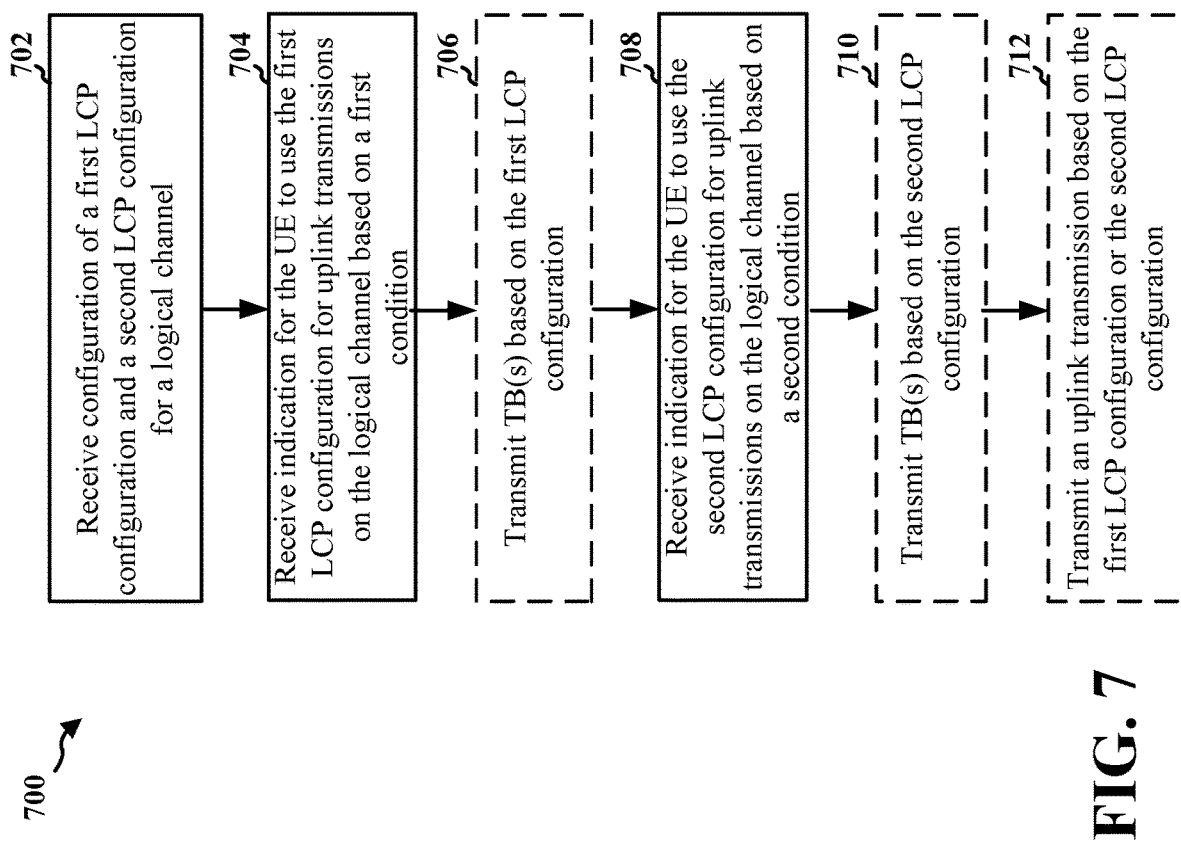
FIG. 7 is a flowchart of a method of wireless communication that includes the configuration of multiple LCP scheduling configurations.

FIG. 7 is a flowchart 700 of a method of wireless communication. The method may be performed by a UE or a component of a UE (e.g., the UE 104, 350, 404, 504; the apparatus 802; a processing system, which may include the memory 360 and which may be the entire UE 350 or a component of the UE 350, such as the TX processor 368, the RX processor 356, and/or the controller/processor 359). Optional aspects are illustrated with a dashed line. The method enables a UE to make more efficient use of wireless resources and to more effectively communication with a base station during different phases of TCP and/or based on different network conditions.

At 702, the UE receives a configuration for a first LCP configuration and a second LCP configuration for a logical channel. The first LCP configuration and the second LCP configuration comprise MAC level LCP configurations. The UE may receive, from a base station, a first LCP configuration and a second LCP configuration for each logical channel. The first LCP configuration and the second LCP configuration each comprise one or more of a priority value for the logical channel, a prioritized bit rate for the logical channel, or a bucket size duration for the logical channel. The priority value for the logical channel may be a lower value indicating a higher priority level in the first LCP configuration than in the second LCP configuration. The prioritized bit rate for the logical channel may be higher in the first LCP configuration than in the second LCP configuration. The bucket size duration for the logical channel may be higher in the first LCP configuration than in the second LCP configuration. The configuration may include aspects described in connection with any of 403, 407, 503, 507 in FIGS. 4 and/or 5. The reception of the configuration may be performed by the LCP configuration component 840 of the apparatus 802 in FIG. 8, e.g., via the reception component 830 and/or the cellular RF transceiver 822.

At 704, the UE receives a first indication to use the first LCP configuration for uplink transmissions on a logical channel based on a first condition. The reception of the indication may be performed by the first condition component 842 of the apparatus 802 in FIG. 8. In some aspects, the reception may be performed via the reception component 830 and/or the cellular RF transceiver 822. For example, as illustrated at 405, the UE may receive a dynamic indication (e.g., in a MAC-CE) of the LCP configuration for the UE to apply, e.g., in response to the base station determining an occurrence of the first condition. The indication may include an LCID and one or more bits indicating to activate the first LCP configuration (or to deactivate a default LCP configuration). In some examples, as illustrated in FIG. 5, the base station may provide parameters to the UE that the UE uses to autonomously select between the first and second LCP configurations. For example, the UE may receive, from the base station, parameters for switching between the first LCP configuration and the second LCP configuration. In this example, the first indication may indicate for the UE to use the first LCP configuration in response to the UE detecting the first condition and the second indication may indicate for the UE to use the second LCP configuration in response to the UE detecting the second condition, e.g., based on the parameters for switching to first LCP configuration. In some examples, the first indication may be an autonomous determination at the UE based on UE information.

At 706, the UE may transmit a TB on the logical channel based on the first LCP configuration. The transmission may be performed, e.g., by the logical channel component 846 via the transmission component 834 and/or the cellular RF transceiver 822. For example, the UE may transmit one or more ACKs for downlink data from the base station based on the parameters of the first LCP configuration, e.g., as described in connection with FIG. 4 and/or FIG. 5. In other examples, the UE may determine to switch based on aspects described in connection with FIG. 4. For example, the second indication may be a determination at the UE based on the parameters for switching between the first LCP configuration and the second LCP configuration. In some examples, the second indication may be an autonomous determination at the UE based on UE information.

At 708, the UE receives a second indication for the UE to use the second LCP configuration for the uplink transmissions on the logical channel based on a second condition. The reception of the indication may be performed by the second condition component 844 of the apparatus 802 in FIG. 8. In some aspects, the reception may be performed via the reception component 830 and/or the cellular RF transceiver 822. For example, as illustrated at 417, the UE may receive a dynamic indication (e.g., in a MAC-CE) of the LCP configuration for the UE to apply. The indication may include an LCID and one or more bits indicating to activate the second LCP configuration (or to deactivate a boosted LCP configuration). The first LCP configuration and the second LCP configuration may be configured in RRC signaling, and the base station may indicate for the UE to use the first LCP configuration or the second LCP configuration in a MAC-CE, in response to the base station detecting an occurrence of the first condition or the second condition. In another example, the second indication may indicate for the UE to use the second LCP configuration in response to the UE detecting the second condition. In yet another example, the second indication may be based on an autonomous determination at the UE that the second condition has occurred and the second LCP configuration is to be applied.

The first condition and the second condition may be based on upper layer protocol states. For example, the first condition may comprise a slow start phase of a TCP and the second TCP phase comprises a steady state phase of the TCP. In another example, at least one of the first condition or the second condition may be based on a QUIC condition or an Ethernet condition. In another example, the first condition and the second condition may be based on MAC level conditions.

As illustrated at 712, the UE may transmit an uplink transmission based on the first LCP configuration or the second LCP configuration. The transmission may be performed, e.g., by the logical channel component 846 via the transmission component 834 and/or the cellular RF transceiver 822.

For example, at 710, the UE may transmit a TB on the logical channel based on the second LCP configuration. The transmission may be performed, e.g., by the logical channel component 846 via the transmission component 834 and/or the cellular RF transceiver 822. For example, the UE may transmit one or more ACKs for downlink data from the base station based on the parameters of the second LCP configuration, e.g., as described in connection with FIG. 4 and/or FIG. 5.

Each block in the flowchart of FIG. 7 and/or the aspects that are performed by the UE in FIGS. 4 and/or 5 may be performed by a component of a UE apparatus that may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the base station includes means for performing the method described in connection with FIG. 7 and/or the aspects performed by the UE in FIGS. 4 and/or 5. The means for performing the described aspects of the method(s) may be one or more of the components of an apparatus and/or a processing system of such an apparatus configured to perform the functions recited by the means. The processing system may include a transmission processor, a reception processor, and a controller/processor. As such, in one configuration, the means may be memory 360, such as the TX processor 368, the RX processor 356, and/or the controller/processor 359 configured to perform the functions recited by the means.

Figure 8:
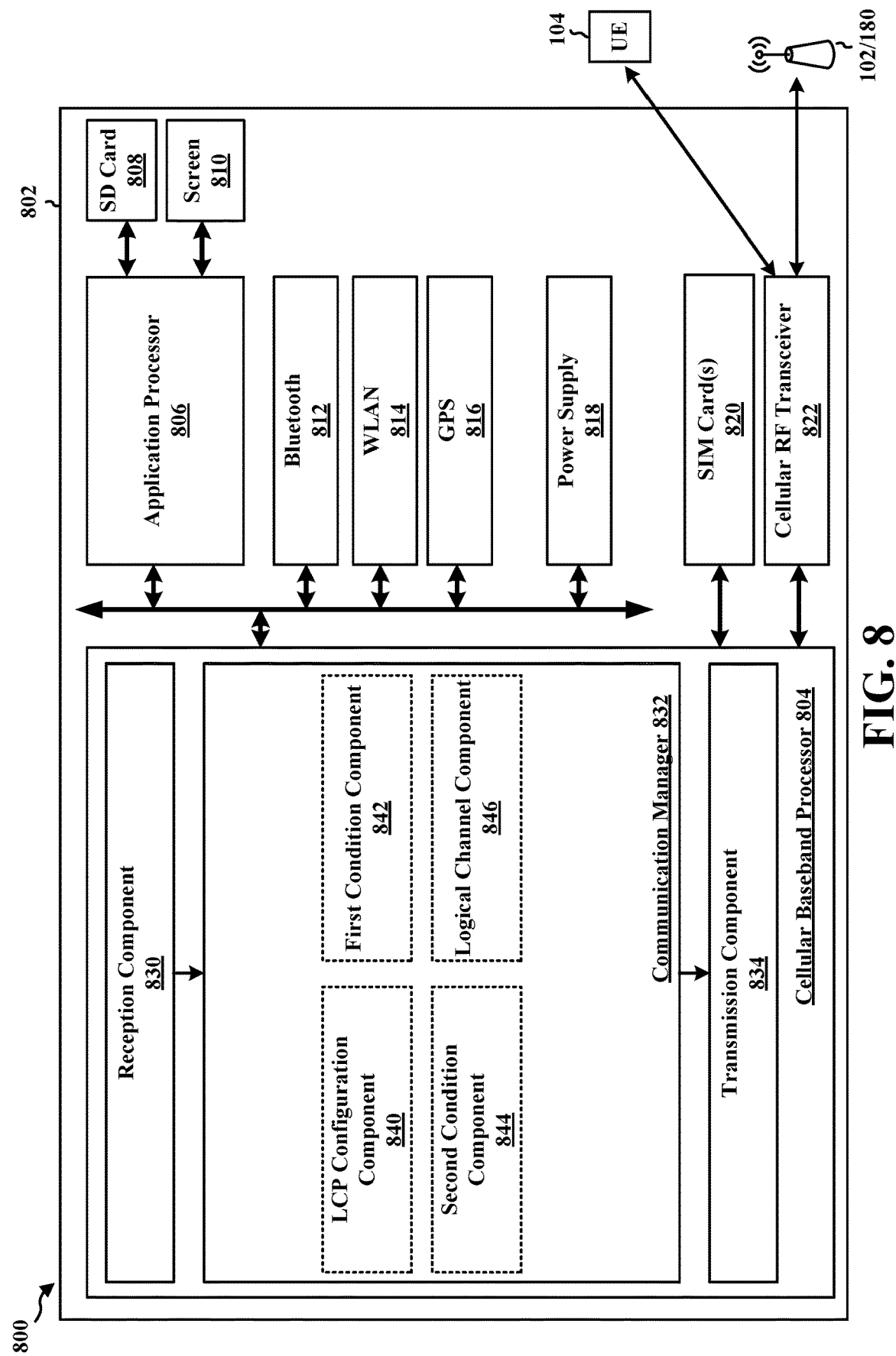
FIG. 8 is a diagram illustrating an example of a hardware implementation for an example apparatus configured to perform aspects of a method of wireless communication that includes application of multiple LCP scheduling configurations.

FIG. 8 is a diagram 800 illustrating an example of a hardware implementation for an apparatus 802. The apparatus 802 may be a UE or a component of a UE and includes a cellular baseband processor 804 (also referred to as a modem) coupled to a cellular RF transceiver 822. In some aspects, the apparatus 802 may further include one or more subscriber identity modules (SIM) cards 820, an application processor 806 coupled to a secure digital (SD) card 808 and a screen 810, a Bluetooth module 812, a wireless local area network (WLAN) module 814, a Global Positioning System (GPS) module 816, and/or a power supply 818. The cellular baseband processor 804 communicates through the cellular RF transceiver 822 with the UE 104 and/or BS 102/180. The cellular baseband processor 804 may include a computer-readable medium/memory. The computer-readable medium/memory may be non-transitory. The cellular baseband processor 804 is responsible for general processing, including the execution of software stored on the computer-readable medium/memory. The software, when executed by the cellular baseband processor 804, causes the cellular baseband processor 804 to perform the various functions described herein. The computer-readable medium/memory may also be used for storing data that is manipulated by the cellular baseband processor 804 when executing software. The cellular baseband processor 804 further includes a reception component 830, a communication manager 832, and a transmission component 834. The communication manager 832 includes the one or more illustrated components. The components within the communication manager 832 may be stored in the computer-readable medium/memory and/or configured as hardware within the cellular baseband processor 804. The cellular baseband processor 804 may be a component of the UE 350 and may include the memory 360 and/or at least one of the TX processor 368, the RX processor 356, and the controller/processor 359. In one configuration, the apparatus 802 may be a modem chip and include just the baseband processor 804, and in another configuration, the apparatus 802 may be the entire UE (e.g., see 350 of FIG. 3) and include the additional modules of the apparatus 802.

The communication manager 832 includes an LCP configuration component 840 that is configured to receive a configuration for a first LCP configuration and a second LCP configuration for a logical channel, e.g., as described in connection with 702 in FIG. 7. The communication manager 832 further includes a first condition component 842 that is configured to receive a first indication to use the first LCP configuration for uplink transmissions on a logical channel based on a first condition, e.g., as described in connection with 704 in FIG. 7. The communication manager 832 further includes a second condition component 844 that is configured to receive a second indication to use the second LCP configuration for uplink transmissions on a logical channel based on a first condition, e.g., as described in connection with 708 in FIG. 7. The communication manager 832 further includes a logical channel component 846 that is configured to transmit an uplink transmission based on the first LCP configuration or the second LCP configuration, e.g., as described in connection with any of 706, 710, and/or 712.

The apparatus may include additional components that perform each of the blocks of the algorithm in the flowchart of FIG. 7 and/or the aspects that are performed by the UE in FIGS. 4 and/or 5. As such, each block in the flowchart of FIG. 7 and/or the aspects that are performed by the UE in FIGS. 4 and/or 5 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 802, and in particular the cellular baseband processor 804, includes means for receiving a configuration for a first LCP configuration and a second LCP configuration for a logical channel, e.g., as described in connection with 702 in FIG. 7. The apparatus 802 may further include means for receiving a first indication to use the first LCP configuration for uplink transmissions on the logical channel based on a first condition and for receiving a second indication to use the second LCP configuration for the uplink transmissions on the logical channel based on a second condition, e.g., as described in connection with 704 and/or 708 of FIG. 7. The apparatus 802 may further include means for transmitting an uplink transmission based on the first LCP configuration or the second LCP configuration, e.g., as described in connection with any of 706, 710, and/or 712. The means may be one or more of the components of the apparatus 802 configured to perform the functions recited by the means. As described herein, the apparatus 802 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 9:
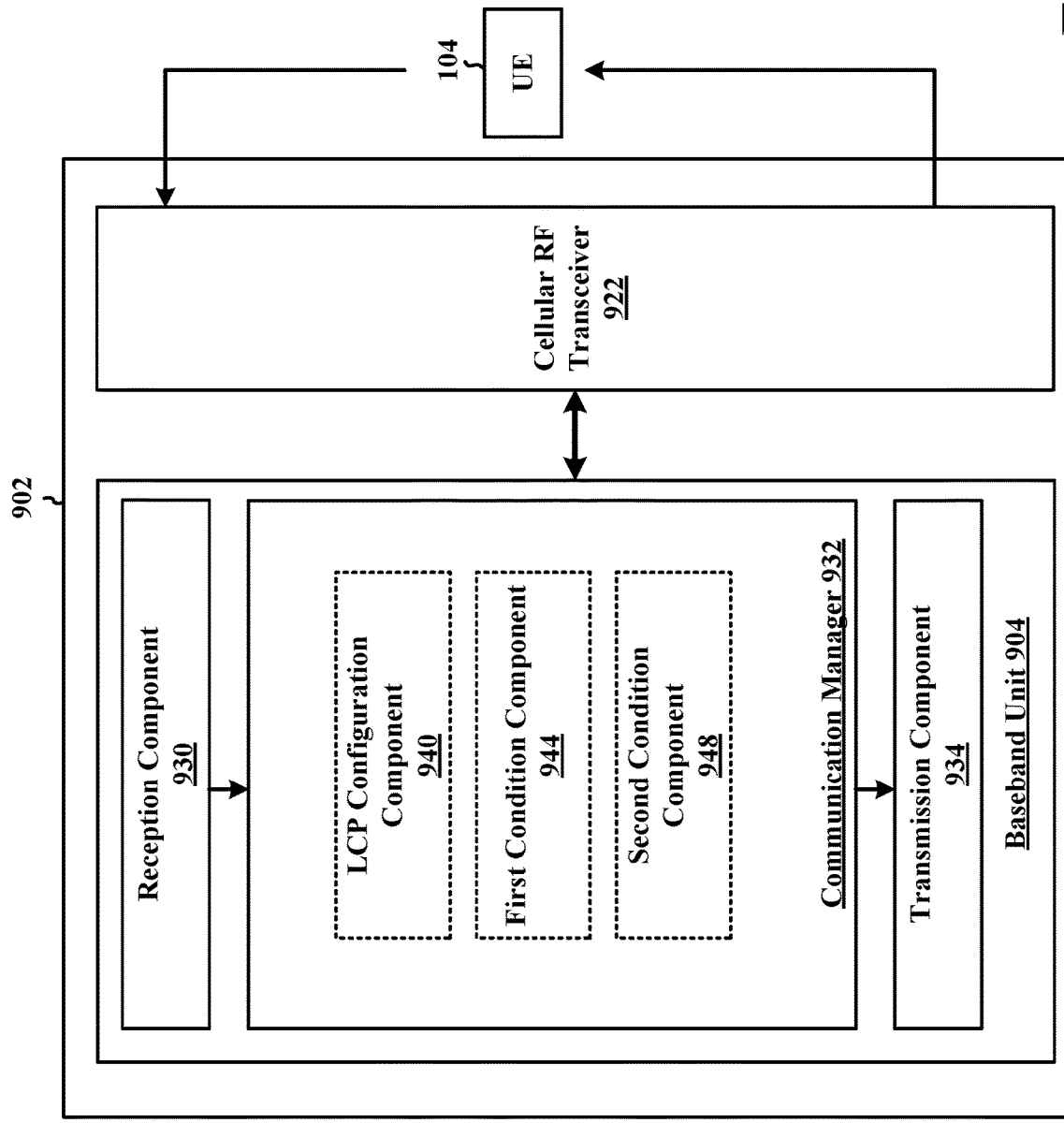
FIG. 9 is a diagram illustrating an example of a hardware implementation for an example apparatus configured to perform aspects of a method of wireless communication that includes configuration of multiple LCP scheduling configurations.

FIG. 9 is a diagram 900 illustrating an example of a hardware implementation for an apparatus 902. The apparatus 902 may be a base station or a component of a base station and includes a baseband unit 904. The baseband unit 904 may communicate through a cellular RF transceiver 922 with the UE 104. The baseband unit 904 may include a computer-readable medium/memory. The baseband unit 904 is responsible for general processing, including the execution of software stored on the computer-readable medium/memory. The software, when executed by the baseband unit 904, causes the baseband unit 904 to perform the various functions described herein. The computer-readable medium/memory may also be used for storing data that is manipulated by the baseband unit 904 when executing software. The baseband unit 904 further includes a reception component 930, a communication manager 932, and a transmission component 934. The communication manager 932 includes the one or more illustrated components. The components within the communication manager 932 may be stored in the computer-readable medium/memory and/or configured as hardware within the baseband unit 904. The baseband unit 904 may be a component of the BS 310 and may include the memory 376 and/or at least one of the TX processor 316, the RX processor 370, and the controller/processor 375.

The communication manager 932 includes an LCP configuration component 940 that is configured to configure a UE with a first LCP configuration and a second LCP configuration for a logical channel, e.g., as described in connection with 602 in FIG. 6. The communication manager 932 further includes a first condition component 944 that is configured to indicate for the UE to use the first LCP configuration for uplink transmissions on a logical channel based on a first condition, e.g., as described in connection with 604 in FIG. 6. The communication manager 932 further includes a second condition component 948 that is configured to indicate for the UE to use the second LCP configuration for uplink transmissions on a logical channel based on a second condition, e.g., as described in connection with 606 in FIG. 6. The apparatus 902 may further include a reception component 930 that is configured to receive an uplink transmission based on the first LCP configuration or the second LCP configuration, e.g., as described in connection with 608 in FIG. 6.

The apparatus may include additional components that perform each of the blocks of the algorithm in the flowchart of FIG. 6 and/or the aspects that are performed by the base station in FIG. 4 or 5 As such, each block in the flowchart of FIG. 6 and/or the aspects that are performed by the base station in FIG. 4 or 5 may be performed by a component and the apparatus may include one or more of those components. The components may be one or more hardware components specifically configured to carry out the stated processes/ algorithm, implemented by a processor configured to perform the stated processes/algorithm, stored within a computer-readable medium for implementation by a processor, or some combination thereof.

In one configuration, the apparatus 902, and in particular the baseband unit 904, includes means for configuring a UE with a first LCP configuration and a second LCP configuration for a logical channel, e.g., as described in connection with 602 in FIG. 6. The apparatus 902 may further include means for indicating for the UE to use the first LCP configuration for uplink transmissions on a logical channel based on a first condition and indicating for the UE to use the second LCP configuration for the uplink transmissions on the logical channel based on a second condition, e.g., as described in connection with 604 and/or 606 in FIG. 6. The apparatus 902 may further include means for receiving and uplink transmission based on the first LCP configuration or the second LCP configuration, e.g., as described in connection with 608 in FIG. 6. The means may be one or more of the components of the apparatus 902 configured to perform the functions recited by the means. As described supra, the apparatus 902 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a base station, comprising: configuring a UE with a first LCP configuration and a second LCP configuration for a logical channel; indicating for the UE to use the first LCP configuration for uplink transmissions on a logical channel based on a first condition; and indicating for the UE to use the second LCP configuration for the uplink transmissions on the logical channel based on a second condition.

In aspect 2, the method of aspect 1 further includes that the first condition and the second condition are based on upper layer protocol states.

In aspect 3, the method of aspect 1 or aspect 2 further includes that the first condition comprises a slow start phase of a TCP and the second condition comprises a steady state phase of the TCP.

In aspect 4, the method of any of aspects 1-3 further includes that at least one of the first condition or the second condition are based on a QUIC condition or an Ethernet condition.

In aspect 5, the method of any of aspects 1-3 further includes that the first condition and the second condition are based on MAC level conditions.

In aspect 6, the method of any of aspects 1-5 further includes that the first LCP configuration and the second LCP configuration comprise MAC level LCP configurations.

In aspect 7, the method of any of aspects 1-6 further includes that the base station configures multiple LCP configurations for each logical channel.

In aspect 8, the method of any of aspects 1-7 further includes that the first LCP configuration and the second LCP configuration each comprise one or more of: a priority value for the logical channel, a prioritized bit rate for the logical channel, or a bucket size duration for the logical channel.

In aspect 9, the method of aspect 8 further includes that the priority value for the logical channel is a lower value indicating a higher priority level in the first LCP configuration than in the second LCP configuration.

In aspect 10, the method of aspect 8 further includes that the prioritized bit rate for the logical channel is higher in the first LCP configuration than in the second LCP configuration.

In aspect 11, the method of aspect 8 further includes that the bucket size duration for the logical channel is higher in the first LCP configuration than in the second LCP configuration.

In aspect 12, the method of any of aspects 1-11 further includes that the first LCP configuration and the second LCP configuration are configured in RRC signaling, and wherein the base station indicates for the UE to use the first LCP configuration in response to detecting the first condition or the second LCP configuration in MAC-CE in response to detecting the second condition.

In aspect 13, the method of any of aspects 1-12 further includes that the base station indicates for the UE to use the first LCP configuration in response to the UE detecting the first condition and indicates for the UE to use the second LCP configuration in response to the UE detecting the second condition.

In aspect 14, the method of any of aspects 1-13 further includes receiving an uplink transmission based on the first LCP configuration or the second LCP configuration.

Aspect 15 is an apparatus for wireless communication at a base station, comprising means for performing the method of any of aspects 1-14.

Aspect 16 is an apparatus for wireless communication at a base station, comprising: a memory; and at least one processor coupled to the memory and configured to perform the method of any of claims 1-14.

Aspect 17 is a non-transitory computer-readable storage medium storing computer executable code for wireless communication at a base station, the code when executed by a processor cause the processor to perform the method of any of claims 1-14.

Aspect 18 is a method of wireless communication at a UE, comprising: receiving a configuration for a first LCP configuration and a second LCP configuration for a logical channel; receiving a first indication to use the first LCP configuration for uplink transmissions on the logical channel based on a first condition; and receiving a second indication to use the second LCP configuration for the uplink transmissions on the logical channel based on a second condition.

In aspect 19, the method of aspect 18 further includes transmitting an uplink transmission based on the first LCP configuration or the second LCP configuration.

In aspect 20, the method of aspect 18 of aspect 19 further includes that the first condition and the second condition are based on upper layer protocol states.

In aspect 21, the method of any of aspects 18-20 further includes that the first condition comprises a slow start phase of a TCP and the second condition comprises a steady state phase of the TCP.

In aspect 22, the method of any of aspects 18-21 further includes that at least one of the first condition or the second condition are based on a QUIC condition or an Ethernet condition.

In aspect 23, the method of any of aspects 18-21 further includes that the first condition and the second condition are based on MAC level conditions.

In aspect 24, the method of any of aspects 18-23 further includes that the first LCP configuration and the second LCP configuration comprise MAC level LCP configurations.

In aspect 25, the method of any of aspects 18-24 further includes that the UE receives multiple LCP configurations for each logical channel.

In aspect 26, the method of any of aspects 18-25 further includes that the first LCP configuration and the second LCP configuration each comprise one or more of: a priority value for the logical channel, a prioritized bit rate for the logical channel, or a bucket size duration for the logical channel.

In aspect 27, the method of aspect 26 further includes that the priority value for the logical channel is a lower value indicating a higher priority level in the first LCP configuration than in the second LCP configuration.

In aspect 28, the method of aspect 26 further includes that the prioritized bit rate for the logical channel is higher in the first LCP configuration than in the second LCP configuration.

In aspect 29, the method of aspect 26 further includes that the bucket size duration for the logical channel is higher in the first LCP configuration than in the second LCP configuration.

In aspect 30, the method of any of aspects 18-29 further includes that the first LCP configuration and the second LCP configuration are received in RRC signaling, and wherein the first indication and the second indication are received a MAC-CE in response to the base station detecting the first condition or the second condition.

In aspect 31, the method of any of aspects 18-30 further includes that the first indication indicates for the UE to use the first LCP configuration in response to the UE detecting the first condition and the second indication indicates for the UE to use the second LCP configuration in response to the UE detecting the second condition.

In aspect 32, the method of any of aspects 18-31 further includes that the first indication and the second indication are autonomous determinations at the UE based on UE information.

Aspect 33 is an apparatus for wireless communication at a UE, comprising means for performing the method of any of aspects 18-32.

Aspect 34 is an apparatus for wireless communication at a UE, comprising: a memory; and at least one processor coupled to the memory and configured to perform the method of any of claims 18-32.

Aspect 35 is a non-transitory computer-readable storage medium storing computer executable code for wireless communication at a UE, the code when executed by a processor cause the processor to perform the method of any of claims 18-32.

What is claimed is:

1. A network entity for wireless communication, comprising:
    memory; and
    at least one processor coupled to the memory, wherein the network entity is configured to:
        provide, to a user equipment (UE), a first logical channel prioritization (LCP) configuration including a first set of one or more parameters for scheduling of uplink data and a first set of one or more mapping restrictions and a second LCP configuration for a logical channel including a second set of one or more parameters for the scheduling of the uplink data and a second set of one or more mapping restrictions;
        indicate, at a first time, for the UE to use the first set of one or more parameters for the scheduling of the uplink data based on the first LCP configuration for uplink transmissions on the logical channel based on a first condition without adjusting a configured grant (CG) configuration; and
        indicate, at a second time, for the UE to use the second set of one or more parameters for the scheduling of the uplink data based on the second LCP configuration for the uplink transmissions on the logical channel based on a second condition without adjusting the CG configuration.

2. The network entity of claim 1, wherein the first condition and the second condition are based on upper layer protocol states.

3. The network entity of claim 2, wherein the first condition comprises a slow start phase of a transmission control protocol (TCP) and the second condition comprises a steady state phase of the TCP.

4. The network entity of claim 2, wherein at least one of the first condition or the second condition are based on a respective QUIC condition or a respective Ethernet condition.

5. The network entity of claim 1, wherein the first condition and the second condition are based on medium access control (MAC) level conditions.

6. The network entity of claim 1, wherein the first LCP configuration and the second LCP configuration comprise medium access control (MAC) level LCP configurations.

7. The network entity of claim 1, wherein the network entity is configured to provide multiple LCP configurations for each logical channel.

8. The network entity of claim 1, wherein the first set of one or more parameters for the scheduling of the uplink data based on the first LCP configuration and the second set of one or more parameters for the scheduling of the uplink data based on the second LCP configuration each comprise one or more of:
a respective priority value for the logical channel,
a respective prioritized bit rate for the logical channel, or
a respective bucket size duration for the logical channel.

9. The network entity of claim 8, wherein a first priority value for the logical channel in the first set of one or more parameters for the scheduling of the uplink data in the first LCP configuration is a lower value indicating a higher priority level than a second priority value for the logical channel in the second set of one or more parameters for the scheduling of the uplink data in the second LCP configuration.

10. The network entity of claim 8, wherein a first prioritized bit rate for the logical channel in the first set of one or more parameters for the scheduling of the uplink data in the first LCP configuration is higher than a second prioritized bit rate for the logical channel in the second set of one or more parameters for the scheduling of the uplink data in the second LCP configuration.

11. The network entity of claim 8, wherein the first set of one or more parameters for the scheduling of the uplink data in the first LCP configuration includes a first bucket size duration for the logical channel that is higher than a second bucket size duration for the logical channel in the second set of one or more parameters for the scheduling of the uplink data in the second LCP configuration.

12. The network entity of claim 1, wherein to provide the first LCP configuration and the second LCP configuration, the network entity is configured to provide the first LCP configuration and the second LCP configuration in radio resource control (RRC) signaling, and
wherein to indicate for the UE to use the first LCP configuration based on detection of the first condition or to use the second LCP configuration based on detection of the second condition, the network entity is configured to indicate, in a medium access control-control element (MAC-CE), for the UE to use the first LCP configuration or the second LCP configuration.

13. A method of wireless communication performed by a network entity, comprising:
providing a user equipment (UE) with a first logical channel prioritization (LCP) configuration including a first set of one or more parameters for scheduling of uplink data and a first set of one or more mapping restrictions and a second LCP configuration for a logical channel including a second set of one or more parameters for the scheduling of the uplink data and a second set of one or more mapping restrictions;
indicating, at a first time, for the UE to use the first set of one or more parameters for the scheduling of the uplink data based on the first LCP configuration for uplink transmissions on the logical channel based on a first condition without adjusting a configured grant (CG) configuration; and
indicating, at a second time, for the UE to use the second set of one or more parameters for the scheduling of the uplink data based on the second LCP configuration for the uplink transmissions on the logical channel based on a second condition without adjusting the CG configuration.

14. The method of claim 13, wherein the first condition and the second condition are based on upper layer protocol states, and the first condition comprises a slow start phase of a transmission control protocol (TCP) and the second condition comprises a steady state phase of the TCP.

15. The method of claim 13, wherein the first set of one or more parameters for the scheduling of the uplink data based on the first LCP configuration and the second set of one or more parameters for the scheduling of the uplink data based on the second LCP configuration each comprise one or more of:
a respective priority value for the logical channel,
a respective prioritized bit rate for the logical channel, or
a respective bucket size duration for the logical channel.

16. An apparatus for wireless communication, comprising:
memory; and
at least one processor coupled to the memory, wherein the apparatus is configured to:
receive a configuration for a first logical channel prioritization (LCP) configuration including a first set of one or more parameters for scheduling of uplink data and a first set of one or more mapping restrictions and a second LCP configuration for a logical channel including a second set of one or more parameters for the scheduling of the uplink data and a second set of one or more mapping restrictions;
receive, at a first time, a first indication to use the first set of one or more parameters for the scheduling of the uplink data based on the first LCP configuration for uplink transmissions on the logical channel based on a first condition;
receive, at a second time, a second indication to use the second set of one or more parameters for the scheduling of the uplink data based on the second LCP configuration for the uplink transmissions on the logical channel based on a second condition; and
transmit an uplink transmission based on the first set of one or more parameters for the scheduling of the uplink data based on the first LCP configuration or the second set of one or more parameters for the scheduling of the uplink data based on the second LCP configuration without adjusting a configured grant (CG) configuration.

17. The apparatus of claim 16, wherein the first condition and the second condition are based on upper layer protocol states.

18. The apparatus of claim 17, wherein the first condition comprises a slow start phase of a transmission control protocol (TCP) and the second condition comprises a steady state phase of the TCP.

19. The apparatus of claim 17, wherein at least one of the first condition or the second condition are based on respective QUIC condition or a respective Ethernet condition.

20. The apparatus of claim 16, wherein the first condition and the second condition are based on medium access control (MAC) level conditions.

21. The apparatus of claim 16, wherein the first LCP configuration and the second LCP configuration comprise medium access control (MAC) level LCP configurations.

22. The apparatus of claim 16, wherein the apparatus is configured to receive multiple LCP configurations for each logical channel.

23. The apparatus of claim 16, wherein the first set of one or more parameters for scheduling the uplink data based on the first LCP configuration and the second set of one or more parameters for the scheduling of the uplink data based on the second LCP configuration each comprise one or more of:
a respective priority value for the logical channel,
a respective prioritized bit rate for the logical channel, or
a respective bucket size duration for the logical channel.

24. The apparatus of claim 23, wherein a first priority value for the logical channel in the first set of one or more parameters for the scheduling of the uplink data in the first LCP configuration is a lower value indicating a higher priority level than a second priority value for the logical channel in the second set of one or more parameters for the scheduling of the uplink data in the second LCP configuration.

25. The apparatus of claim 23, wherein a first prioritized bit rate for the logical channel in the first set of one or more parameters for the scheduling of the uplink data in the first LCP configuration is higher than a second prioritized bit rate for the logical channel in the second set of one or more parameters for the scheduling of the uplink data in the second LCP configuration.

26. The apparatus of claim 23, wherein the first set of one or more parameters for the scheduling of the uplink data in the first LCP configuration includes a first bucket size duration for the logical channel that is higher than a second bucket size duration for the logical channel in the second set of one or more parameters for the scheduling of the uplink data in the second LCP configuration.

27. The apparatus of claim 16, wherein, to receive the first LCP configuration and the second LCP configuration, the apparatus is configured to receive the first LCP configuration and the second LCP configuration in radio resource control (RRC) signaling, and wherein, to receive the first indication and the second indication, the apparatus is configured to receive the first indication and the second indication in a medium access control-control element (MAC-CE).

28. The apparatus of claim 16, wherein the first indication and the second indication are autonomous determinations at the apparatus based on UE information associated with the UE.

29. A method for wireless communication performed by a user equipment (UE), comprising:
receiving a configuration for a first logical channel prioritization (LCP) configuration including a first set of one or more parameters for scheduling of uplink data and a first set of one or more mapping restrictions and a second LCP configuration for a logical channel including a second set of one or more parameters for the scheduling of the uplink data and a second set of one or more mapping restrictions;
receiving, at a first time, a first indication to use the first set of one or more parameters for the scheduling of the uplink data based on the first LCP configuration for uplink transmissions on the logical channel based on a first condition;
receiving, at a second time, a second indication to use the second set of one or more parameters for the scheduling of the uplink data based on the second LCP configuration for the uplink transmissions on the logical channel based on a second condition; and
transmitting an uplink transmission based on the first set of one or more parameters for the scheduling of the uplink data based on the first LCP configuration or the second set of one or more parameters for the scheduling of the uplink data based on the second LCP configuration without adjusting a configured grant (CG) configuration.

30. The method of claim 29, wherein the first condition and the second condition are based on upper layer protocol states, and the first condition comprises a slow start phase of a transmission control protocol (TCP) and the second condition comprises a steady state phase of the TCP.

* * * * *